C. H. ALLEN.
ELECTRICALLY OPERATED RELEASING DEVICE FOR WEIGHING MACHINES.
APPLICATION FILED FEB. 19, 1918.

1,291,707.

Patented Jan. 21, 1919.
3 SHEETS—SHEET 1.

Witness
Fenton N Belt
A L Hough

Inventor
Charles H Allen
By Frank V Hough
Attorney

C. H. ALLEN.
ELECTRICALLY OPERATED RELEASING DEVICE FOR WEIGHING MACHINES.
APPLICATION FILED FEB. 19, 1918.

1,291,707.

Patented Jan. 21, 1919.
3 SHEETS—SHEET 2.

Witness
Fenton S. Belt
A. L. Hough

Inventor
Charles H. Allen
By Francis N. Hoyt
Attorney

C. H. ALLEN.
ELECTRICALLY OPERATED RELEASING DEVICE FOR WEIGHING MACHINES.
APPLICATION FILED FEB. 19, 1918.
1,291,707. Patented Jan. 21, 1919.
3 SHEETS—SHEET 3.
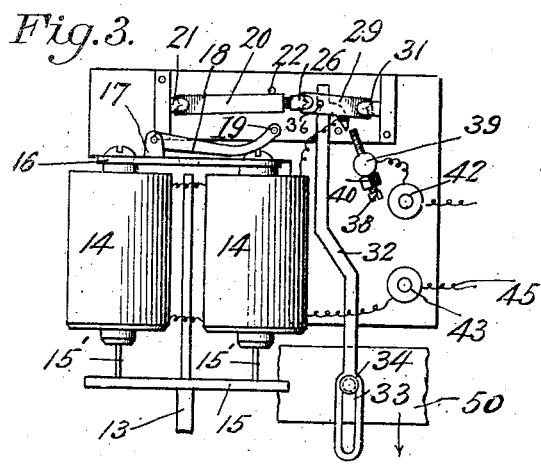
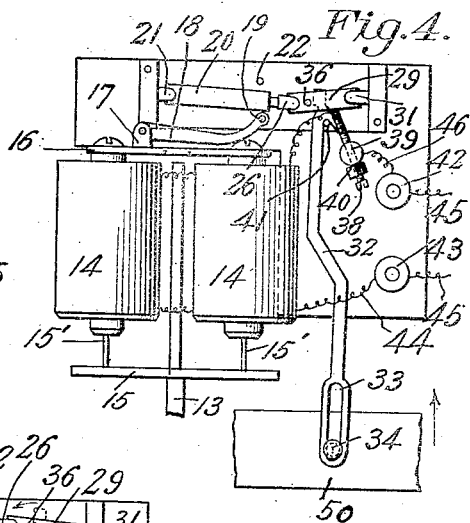
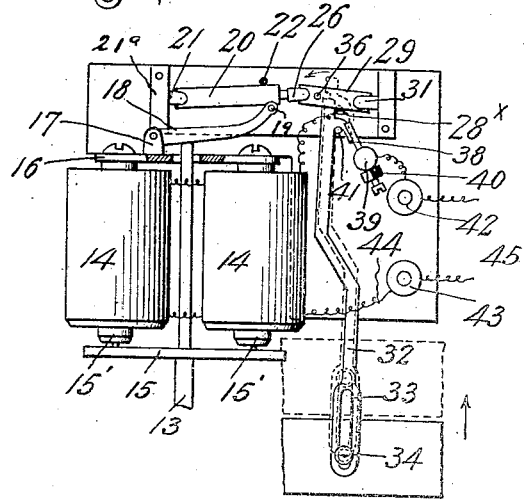
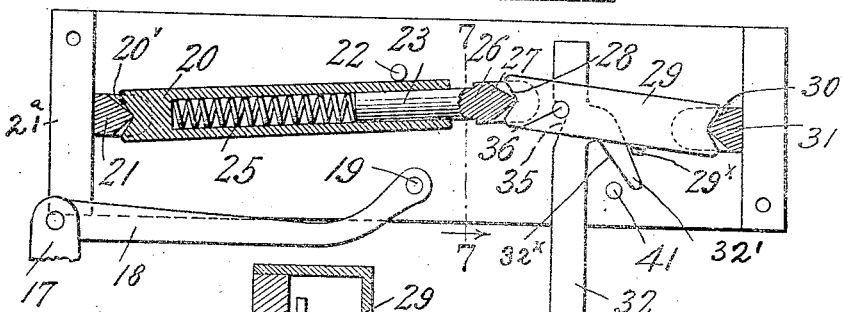
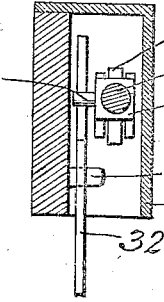
Inventor
Charles H. Allen.

UNITED STATES PATENT OFFICE.

CHARLES H. ALLEN, OF PITTSBURGH, PENNSYLVANIA, ASSIGNOR, BY MESNE ASSIGN-
MENTS, TO THE MORRIS AUTOMATIC SCALE COMPANY, A CORPORATION OF SOUTH
DAKOTA.

ELECTRICALLY-OPERATED RELEASING DEVICE FOR WEIGHING-MACHINES.

1,291,707.   Specification of Letters Patent.   Patented Jan. 21, 1919.

Application filed February 19, 1918. Serial No. 218,112.

*To all whom it may concern:*

Be it known that I, CHARLES H. ALLEN, a citizen of the United States, residing at Pittsburgh, in the county of Allegheny and State of Pennsylvania, have invented certain new and useful Improvements in Electrically - Operated Releasing Devices for Weighing-Machines; and do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic releasing mechanism for weighing machines and consists of an electrically operated attachment whereby a slide regulating the exit opening of a hopper may be released and permitted to close when the requisite amount has been weighed.

The invention consists of further details of construction combinations and arrangements of parts which will be hereinafter fully described shown in the accompanying drawings and then specifically defined in the appended claims.

I illustrate my invention in the accompanying drawings which, with the letters of reference marked thereon, form a part of this specification and in which:

Fig. 3 is an enlarged view in elevation of electrically operated means for releasing the slide regulating the exit opening of the hopper.

Fig. 4 is a similar view showing the relative locations of the parts immediately after the circuit is closed.

Fig. 5 is a view in elevation showing the position of the parts after the circuit has energized the electro-magnet and released the slide.

Fig. 6 is an enlarged detail partially in section showing the means for closing the circuit and re-setting the device.

Fig. 7 is a sectional view on line 7—7 of Fig. 6, and

Figure 1:
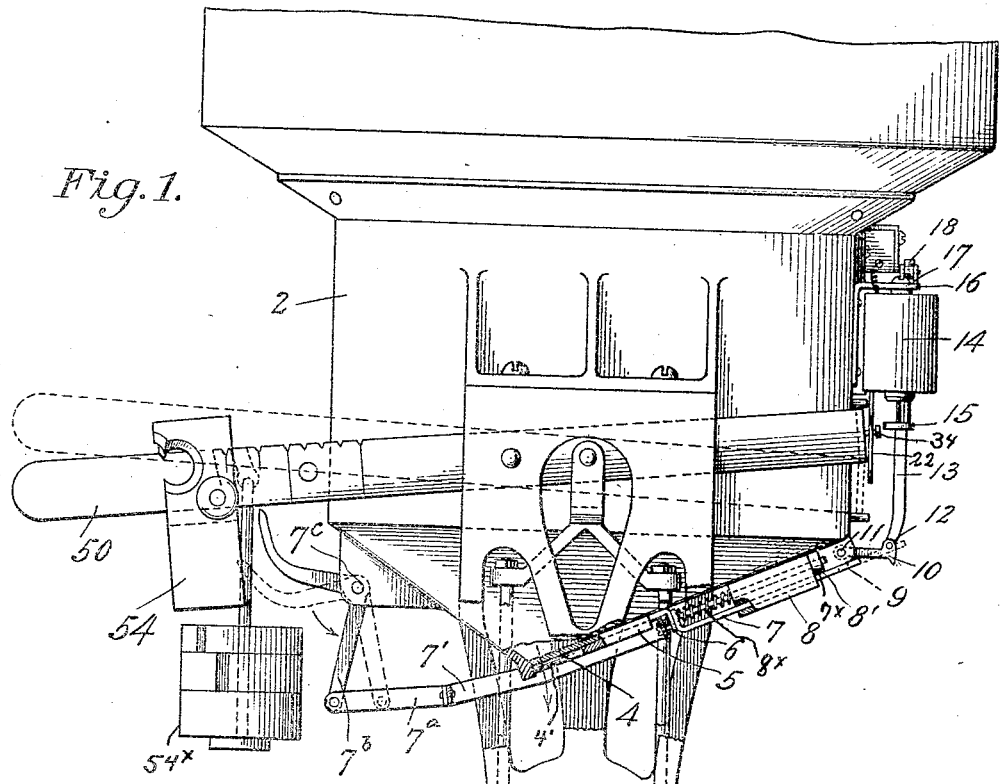
Figure 1 is a side elevation of the weighing machine showing the application of my invention thereto.
Figure 2:
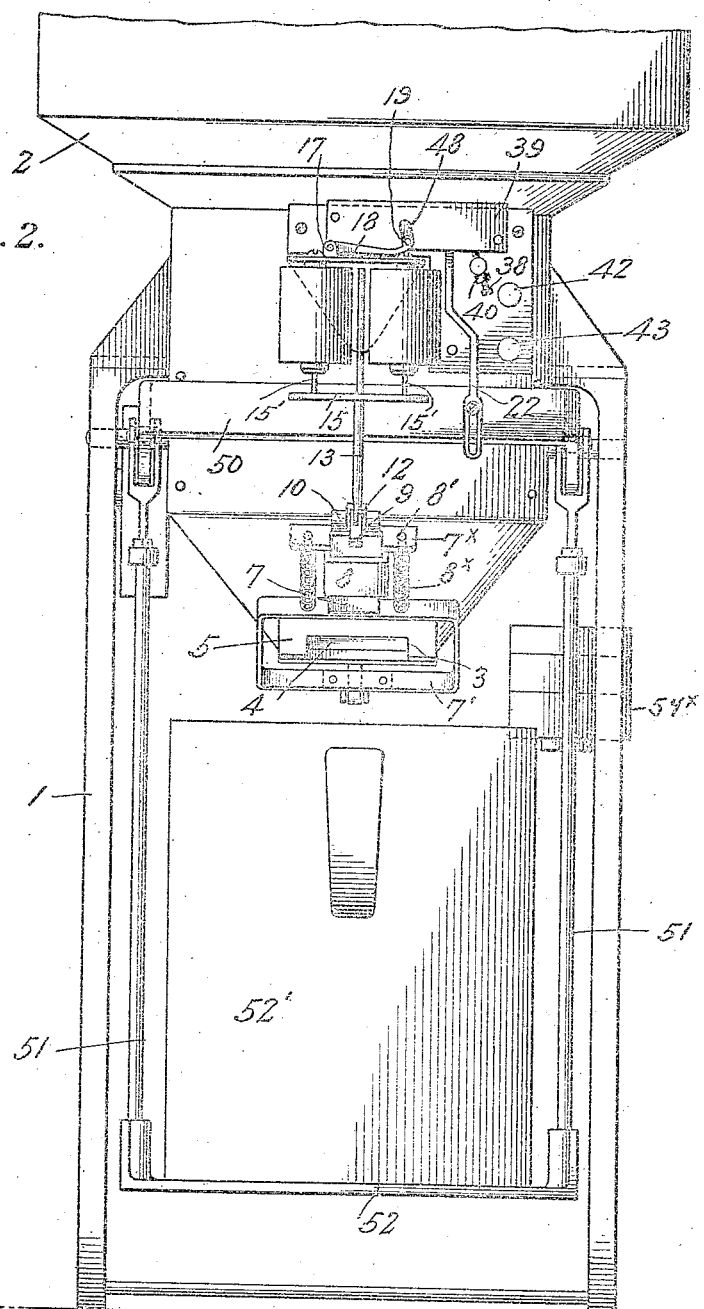
Fig. 2 is a rear elevation of the machine.

Reference now being had to the details of the invention by numerals:

1 designates the frame of the weighing machine which has a hopper 2 in which the commodity to be weighed is placed, said hopper having an exit opening 4' in the inclined bottom thereof and which is regulated by the longitudinally movable slide 4 guided by the strap 5 secured to the bottom of the hopper. Said slide has an angled end 6 as shown in Fig. 1 of the drawings which is fastened to the lower angled end of a bar 7 having an aperture 9 formed therein, as shown in Fig. 2 of the drawings and which is adapted to be engaged by the free end of the pawl 10 which is pivotally mounted upon the pin 11 upon the under side of the hopper. Rods 8' are passed through the lugs 7$^x$ and the bail-shaped member 7' as shown clearly in Fig. 2 of the drawings, and coiled springs 8$^x$ are interposed between said member 7' and the lugs 7$^x$. Said member 7' is connected to the adjacent angled ends of the slide 4 and bar 7 through the medium of a pin 6, a slight space intervening between the adjacent end of the member 7' and the angled end of the slide allowing a slight play.

An angled lever 7$^b$ is pivotally mounted upon a pin 7$^c$ upon the lower portion of the hopper and is connected through the medium of the link 7$^a$ with one end of the bail-shaped member 7. In the position of the parts shown in Fig. 1 of the drawings the slide is shown closed over the exit opening 4', being thrown to a different position when released by the pawl 10. 13 is a rod pivotally connected at 12 to the pawl and fastened to the armature 15 through which it passes, the latter being provided with rods 15' movable through the coils of the solenoids. A bar 16 connects the upper ends of the solenoids and is apertured centrally to permit the upper end of the rod 13 to pass through the same when the solenoids are energized.

A circuit-closing means is illustrated in Figs. 3 and 6 of the drawings in which a tubular member 20 has it outer end notched as at 20', having a bearing against the angled end of the lug 21 projecting from the rib 21$^a$. A member 29 has its outer end notched as at 30 as shown in Fig. 6 of the drawings and has a bearing against the angled end of the lug 31. A pin 23 telescopes with the tubular member 20, and 25 is a coiled spring within the tubular member 20 and bears intermediate the inner end of the pin 23 and the inner end of the bore of said member. The pin 23 has a square outlined head 26 as shown in Fig. 7 of the drawings and is recessed, the bottom of the recess forming a ridge 27 the edge of which has a bearing in the notch 28 of the member 29. A contact point 29ˣ is formed upon the member 29 and which when the parts are thrown to the position shown in Fig. 4 is adapted to contact with the screw 38 mounted in the terminal 39 and held in an adjusted position by means of the jam nut 40. Electrical connection is made between the terminals 39 and 42 through the wiring 46, and 45 is a wire connected at one end to the terminal 42 and its other end adapted to be connected to the source of supply of current. Electrical wiring 45 is adapted to communicate with the source of supply and also with a terminal 43 which in turn is electrically connected through the medium of the wire 44 with electro-magnet 14. The electro-magnet shown in Fig. 3 has electrical connection with the terminal 29ˣ.

A gravity bar 32 has an elongated slot 33 formed therein and through which a pin 34 passes which pin is connected to the bail-shaped balancing beam 50. The upper end of the bar 32 has a hook 32' shown in enlarged detail view in Fig. 6 of the drawings, having its under edge 32ˣ inclined. A pin 41 projects from the frame underneath said inclined edge and against which the latter is adapted to contact when the bar is permitted to lower by gravity and which will tend to cause the bar to tilt, so that a notch 35 in its edge will be thrown out of the path of the pin 36 projecting from the member 29 as shown clearly in Fig. 7 of the drawings.

A finger 18 is pivotally mounted upon a pin carried by the lug 17 rising from the plate 16 and which finger is directly above the upper end of the rod 13 and which latter when the electro-magnet is energized causes the finger to be raised. A pin 19 projects laterally from the finger and moves in a slot 48 formed in the casing 39, and is adapted to contact with the under edge of the member 20 for the purpose of throwing the two members 20 and 29 from the position shown in Fig. 4 of the drawings to that shown in Fig. 3. A pin 22 projects from the frame and serves as a means of limiting the upper tilting movement of the member 20.

A platform 52 is supported by the bars 51, connected to the balancing beam 50, and upon which platform a receptacle 52' is adapted to be placed to receive the commodity which is to be weighed. A weight 54 is mounted upon one arm of the balancing beam and a weight 54ˣ upon the other arm.

Figure 8:
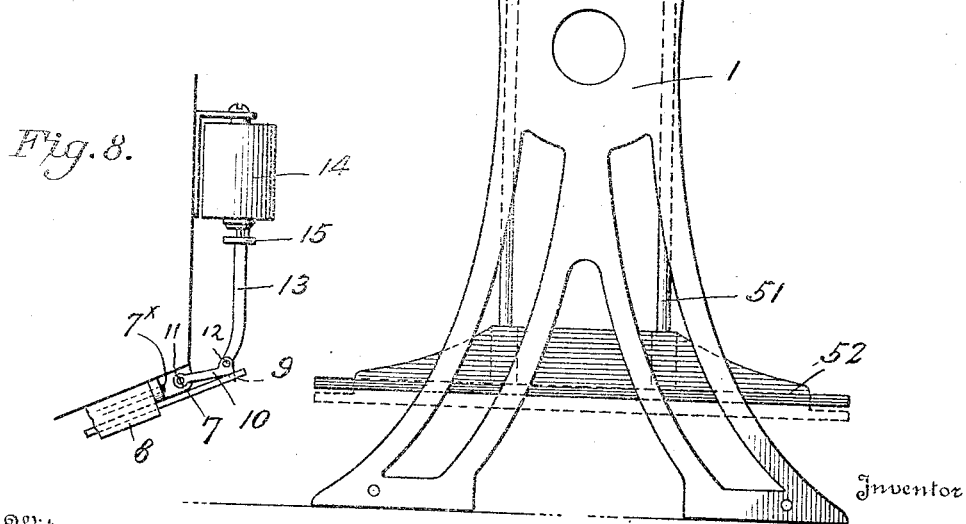
Fig. 8 is a detailed view in elevation showing the slide held in an open position by the electrically-operated latch.

When it is desired to weigh a commodity the operator tilts the lever 7ᵇ causing the slide 4 to open the exit 4' and as the slide opens the bar 7 will be moved from the position shown in solid lines in Fig. 1 of the drawings to that in dotted lines and which will permit the free end of the pawl 10 to engage the aperture 9 in the bar 7 as shown in Fig. 8 of the drawings, thus holding the slide open. During this operation the electrically operated releasing bars assume the position shown in Fig. 3 of the drawings. When the requisite amount being weighed causes the beam 50 to balance, the downward tilting of the latter will cause the pin 34 carried thereby to contact with the lower end of the slot 33, thus pulling down the gravity bar 32 slightly. As the notch 35 in the bar 32 is in engagement with the pin 36 as shown in Fig. 6 of the drawings, the downward movement of the bar 32 will cause the two members 20 and 29 to buckle and be drawn down toward the position shown in Fig. 4 of the drawings. As the bar 32 lowers the inclined edge 32ˣ upon the hook 32' will come in contact with the pin 41 and cause the bar 32 to swing to the right sufficiently so that the notch 35 will clear the pin 36. The moment the terminal 29ˣ comes in contact with the end of the screw 38, which is connected to the terminal 39, the circuit will be closed and the armature 15 will be instantly thrown to the position shown in Fig. 5 of the drawings, and the rod 13 moving with the armature will release the pawl 10 from the aperture 9 in the bar 7 permitting the springs 8ˣ to quickly return the slide 4 to a closed position, and thus cut off the supply of commodity being weighed. As the upper end of the rod 13, which is secured to the armature, comes in contact with the under edge of the finger 18 the pin 19 will contact with the member 20, thereby causing the latter and the member 29 to be thrown back to their original positions shown in Fig. 3 of the drawings, and which will be held in such position by the coiled spring 25. As the members 20 and 29 are thrown to the positions shown in Fig. 3 circuit will be broken and the armature 15 will fall by gravity to its normal position as shown in Figs. 3 and 4 of the drawings, permitting the finger 18 to return to its normal position. When it is again desired to weigh a commodity, the first step in the operation is to tilt the lever 7ᵇ actuating the slide to open the exit in the hopper and this movement will cause the pin 34 to contact with the upper end of the slot 33 in the bar 32 and as the latter is elevated, it will tilt by gravity so that the notch 35 will engage the pin 36 and in readiness to again cause the members 20 and 29 to be thrown down by the downward tilting of the balancing beam and which will again cause the circuit to be closed and the operation repeated.

What I claim to be new is:

1. An electrically-operated weighing machine, comprising a hopper with a spring actuated slide regulating the exit opening therein, a balancing beam, buckling members, an electro-magnet, and a terminal with electrical connections between the magnet and terminal and one of said buckling members, a gravity bar adapted to be actuated by said balancing beam to cause said members to buckle and effect a contact with one of the same with said terminal, a latch, and means connected thereto and actuated by the armature of the electro-magnet as the circuit is closed to release the latch permitting the slide to close the exit opening of the hopper.

2. An electrically-operated weighing machine, comprising a hopper with a spring actuated slide regulating the exit opening therein, a balancing beam, buckling members, an electro-magnet, and a terminal with electrical connections between the magnet and terminal and one of said buckling members, a gravity bar adapted to be actuated by said balancing beam to cause said members to buckle and effect a contact of one of the same with said terminal, a latch, and means connected thereto and actuated by the armature of the electro-magnet as the circuit is closed to release the latch permitting the slide to close the exit opening of the hopper, and means for returning the buckling members to their normal positions immediately after the circuit is closed and the latch released.

3. An electrically-operated weighing machine, comprising a hopper with a spring actuated slide regulating the exit opening therein, a balancing beam, buckling members, an electro-magnet, and a terminal with electrical connections between the magnet and terminal and one of said buckling members, a gravity bar adapted to be actuated by said balancing beam to cause said members to buckle and effect a contact with one of the same with said terminal, a latch, and means connected thereto and actuated by the armature of the electro-magnet as the circuit is closed to release the latch permitting the slide to close the exit opening of the hopper, a tilting finger, and means connected to the armature for actuating said finger to cause the buckling members to be thrown back to their normal positions after the circuit is closed and the latch released.

4. An electrically-operated weighing machine, comprising a hopper with a spring actuated slide regulating the exit opening therein, a balancing beam, buckling members, an electro-magnet, and a terminal with electrical connections between the magnet and terminal and one of said buckling members, a gravity bar adapted to be actuated by said balancing beam to cause said members to buckle and effect a contact with one of the same with said terminal, a latch, and means connected thereto and actuated by the armature of the electro-magnet as the circuit is closed to release the latch permitting the slide to close the exit opening of the hopper, a tilting finger, and means connected to the armature for actuating said finger to cause the buckling members to be thrown back to their normal positions after the circuit is closed and the latch released, and means for raising said gravity bar to its starting position after the buckling members have been returned to their normal positions.

5. An electrically-operated weighing machine, comprising a hopper with a spring actuated slide regulating the exit opening therein, a balancing beam, buckling members, an electro-magnet, and a terminal with electrical connections between the magnet and terminal and one of said buckling members, a gravity bar adapted to be actuated by said balancing beam to cause said members to buckle and effect a contact with one of the same with said terminal, a latch, and means connected thereto and actuated by the armature of the electro-magnet as the circuit is closed to release the latch permitting the slide to close the exit opening of the hopper, a tilting finger having a pin projecting therefrom underneath one of said buckling members, and a projection upon the armature to tilt said finger as the circuit is closed and latch released causing the buckling members to be returned to their normal positions.

6. An electrically-operated weighing machine, comprising a hopper with a spring actuated slide regulating the exit opening therein, a balancing beam, buckling members, an electro-magnet, and a terminal with electrical connections between the magnet and terminal and one of said buckling members, a gravity bar having a notch in one edge, a pin upon one of said buckling members engaged by said notch, a pin projecting from the balancing beam and engaging said bar, causing the same to be drawn down as the beam balances, thus causing the members to buckle and to close the circuit, and means for throwing the gravity bar out of the path of the pin upon the buckling members as the bar lowers, a latch engaging the slide to hold the same open, and connections between the latch and the armature of the electro-magnet, and means actuated by the armature for returning the buckling members to their normal positions after the circuit is closed and the latch released.

7. An electrically-operated weighing machine, comprising a hopper with a spring actuated slide regulating the exit opening therein, a balancing beam, buckling members, an electro-magnet, and a terminal with electrical connections between the magnet and terminal and one of said buckling members, a gravity bar having a notch in one edge, a pin upon one of said buckling members engaged by said notch, means connected to the balancing beam for raising the bar as the beam tilts, said bar having a finger with an inclined edge, and a pin in the path of said inclined edge and adapted as the bar lowers to throw the notch in the latter out of the path of the pin upon the buckling member.

8. An electrically-operated weighing machine, comprising a hopper with a spring actuated slide regulating the exit opening therein, a balancing beam, buckling members, a pin projecting from one of the latter, an electro-magnet and terminals electrically connected therewith and with one of said buckling members, a gravity bar having a notch in one edge, a pin upon the balancing beam adapted to raise said bar as the beam tilts, thus permitting the notch to engage the pin on the buckling member, a latch, and connections between the same and slide, a rod pivoted to said latch and fastened to the armature of the electro-magnet, and means actuated by the armature to cause the buckling members to be returned to their normal positions after the circuit is closed and the latch released.

9. An electrically-operated weighing machine, comprising a hopper with a spring actuated slide regulating the exit opening therein, a balancing beam, buckling members, a pin projecting from one of the latter, an electro-magnet and terminals electrically connected therewith and with one of said buckling members, a gravity bar having an elongated slot therein, a pin fastened to the balancing beam and passing through said slot, one edge of the bar having a notch adapted to engage the pin projecting from one of the buckling members, and a hook upon its opposite edge with an inclined edge, and a stationary pin against which said inclined edge contacts to tilt the bar as the latter lowers by the tilting down of the balancing beam.

10. An electrically-operated weighing machine, comprising a hopper, a balancing beam, and a platform connected therewith, a slide regulating the exit opening in the hopper, a bail-shaped member fastened to the slide, an angled lever pivotally mounted upon the hopper and having link connections with said bail-shaped member, a bar fastened to the slide, springs bearing between lugs upon the hopper and said bar which is secured to the slide, a latch engaging said bar, an electro-magnet, an armature, a rod fastened to the latter and pivoted to said latch, buckling members, electrical connections between one of the latter and said electro-magnet, a gravity bar having pivotal connection with the balancing beam and designed as the latter tilts to cause said members to buckle and close the circuit, means actuated by the armature for returning the buckling members to their normal positions after the circuit is closed and the latch released.

In testimony whereof I hereunto affix my signature in presence of two witnesses.

CHARLES H. ALLEN.

Witnesses:
HENRY G. GILES,
ERNEST PAYNE.

Copies of this patent may be obtained for five cents each, by addressing the "Commissioner of Patents, Washington, D. C."